United States Patent [19]

Thankachan et al.

[11] 4,298,658
[45] Nov. 3, 1981

[54] VAPOR PERMEATION CURABLE COATINGS BASED ON ALKYD RESINS

[75] Inventors: Chacko Thankachan, Willowdale; John G. Ritchie, Mississauga; Eugene Sahayada, Toronto; Asok Sengupta, Downsview, all of Canada

[73] Assignee: J.G.L. Chemicals Ltd., Toronto, Canada

[21] Appl. No.: 145,704

[22] Filed: May 1, 1980

Related U.S. Application Data

[63] Continuation-in-part of Ser. No. 76,680, Sep. 19, 1979, Pat. No. 4,267,239.

[51] Int. Cl.$^3$ .................. C08L 91/00; B05D 3/02; B32B 27/40
[52] U.S. Cl. .................. 428/425.1; 260/22 TN; 427/385.5; 427/388.2; 427/389.7; 427/393; 428/423.1; 428/425.6; 428/425.8
[58] Field of Search .............. 260/22 TN; 427/385.5, 427/388.2, 389.7, 393; 428/423.1, 425.1, 425.6, 425.8

[56] References Cited

U.S. PATENT DOCUMENTS 3,789,037  1/1974  Miller .................. 260/22 TN
3,920,595  11/1975  Anderson et al. .......... 260/22 TN Primary Examiner—Michael R. Lusignan
Attorney, Agent, or Firm—Bachman and LaPointe

[57] ABSTRACT

Improved coating compositions for use in diversified applications, curable by permeation of a tertiary amine vapor or without permeation at room temperature. The composition and the coating process are characterized by the modification of an alkyd resin, having free hydroxyl groups, by reaction with p-hydroxybenzoic acid or 2,6-dimethylol-p-cresol. The coatings display good flexibility and high gloss as well as good color retention and good adhesion to substrates.

24 Claims, No Drawings

VAPOR PERMEATION CURABLE COATINGS BASED ON ALKYD RESINS

CROSS-REFERENCE TO RELATED APPLICATIONS

This application is a continuation-in-part of U.S. patent application Ser. No. 076,680, filed Sept. 19, 1979, now U.S. Pat. No. 4,267,239, patented May 12, 1981.

BACKGROUND OF THE INVENTION (i) Field of the Invention

This invention relates to coating compositions and more particularly to decorative coating compositions that can be rapidly cured to urethane coatings at ambient temperature.

(ii) Description of the Prior Art

It is well established that polyisocyanates react with active hydrogen compounds, for example, polyols to form urethanes. Urethane based coatings are well known for their toughness, chemical resistance and durability.

The reaction is illustrated by Equation I:

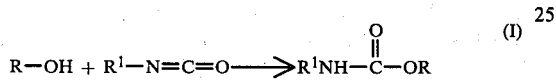

wherein R is the backbone of the polyol and $R^1$ is the backbone of the polyisocyanate.

The reaction is accelerated in the presence of a tertiary amine. The reaction in the presence of a tertiary amine is believed to proceed via the formation of an intermediate with the conversion of the intermediate to the urethane involving the formation of an orthoester type structure followed by the expulsion of the amine.

One possible reaction mechanism is illustrated in Scheme (I) below, employing triethylamine as the tertiary amine:

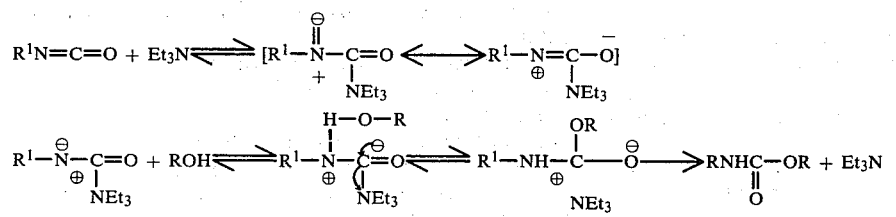

A second possibility is shown in Scheme II:

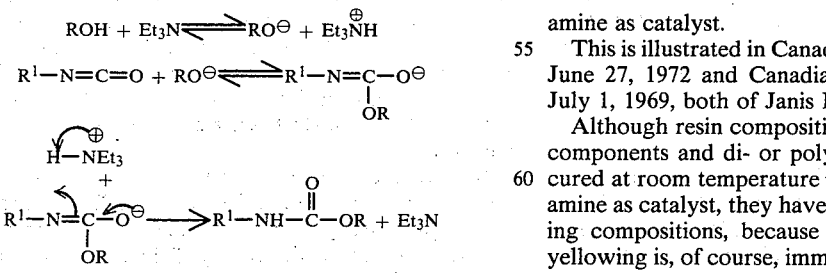

These mechanisms suggest that the more active the hydrogen of the hydroxyl group in the polyol, i.e., the more acidic is the hydrogen, the faster will be the reaction with the di- or polyisocyanates to form the cured urethane, in the presence of the tertiary amine vapour. The presence of free carboxyl groups in the coating composition is not good since the resultant product formed with the isocyanate is unstable and carbon dioxide is evolved in the form of bubbles which produce a non-smooth, bubbled surface, in accordance with Equation II:

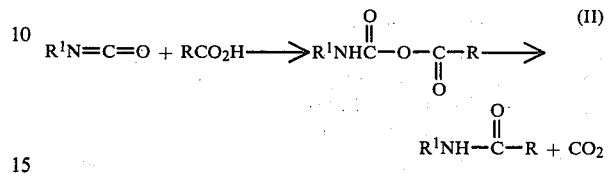

Among the organic hydroxyl group-containing compounds, aromatic hydroxyl compounds, for example, phenolics have more acidic hydroxyl hydrogen atoms than do aliphatic hydroxyl compounds, because phenoxide ions are resonance stabilized for example, a phenoxide ion is resonance stabilized in accordance with structures 1, 2 and 3:

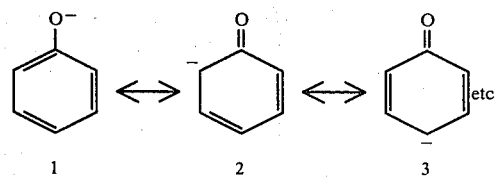

Hence, phenolic resins, for example, novolacs and resoles, having phenolic hydroxyl groups available for cross linking with free isocyanate groups would appear to be suitable for reaction with di- and poly-isocyanates to give urethanes.

This type of reaction has been taken advantage of in the preparation of foundry resins in which the resin is cured at room temperature by employing a tertiary amine as catalyst.

This is illustrated in Canadian Pat. No. 903,944, issued June 27, 1972 and Canadian Pat. No. 816,762, issued July 1, 1969, both of Janis Robins.

Although resin compositions based on phenolic resin components and di- or poly-isocyanate can be rapidly cured at room temperature in the presence of a tertiary amine as catalyst, they have not been employed in coating compositions, because they tend to yellow. The yellowing is, of course, immaterial in foundry resins but is unacceptable in a coating composition, particularly a decorative coating composition.

The yellowing is believed to be a result of the formation quinanoid type structures by the action of ultraviolet light in accordance with Equation III:

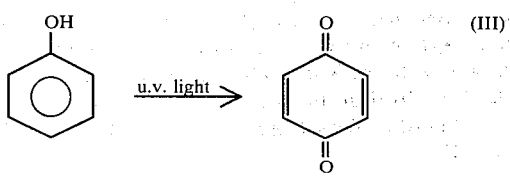

Another problem with such phenolic resins in coating applications is the poor flexibility of the coating due to the inflexible aromatic rings joined by shorter hydrocarbon chains. Also the pot life of the phenolic resin compositions is short when mixed with the isocyanates, the compositions do not produce coatings of adequate gloss for top coat application.

Various attempts have been made to overcome certain of these problems, for example, in Canadian Pat. No. 1,005,943, issued Feb. 2, 1977, David D. Taft; U.S. Pat. No. 3,789,044 issued Jan. 29, 1974 and U.S. Pat. No. 3,836,491, issued Sept. 17, 1976, both of David D. Taft et al. The Canadian Patent is concerned with diphenolic acid capping compounds; U.S. Pat. No. 3,789,044 is concerned with hydroxybenzoic acid capped epoxides; and U.S. Pat. No. 3,836,491 is concerned with capping a hydroxy-containing prepolymer with hydroxybenzoic acid and curing the capped, prepolymer with a polyisocyanate.

Although these developments have provided coating compositions of improved characteristics as compared with the compositions previously employed in the foundry art, they have nevertheless not been entirely satisfactory. In particular these compositions do not produce coatings having a satisfactory gloss, and as a result they cannot be employed as top coats. In practice they have been used only as base coats and in filter coats for porous substrates. The industry requires top coat compositions of high gloss and prior to the present invention there has been no top coat composition of adequate glass which can be rapidly cured by a tertiary amine.

Thus, existing manufacturers have required the use of quite different coating compositions for the base coats and top coats in, for example, the manufacture of decorative articles such as those described in Canadian Pat. No. 981,124, issued Jan. 6, 1976.

There has thus been a need for a single chemical coating composition which can be rapidly cured with a tertiary amine, and that can be employed to provide a fill coat composition, a base coat composition and a top coat composition.

In addition the flexibility of the prior coating compositions of Taft has not been completely satisfactory and compositions such as those of Taft Canadian Pat. No. 1,005,943 have poor caustic resistance if there are uncured aromatic hydroxyl groups, owing to the resultant ionization.

The poor flexibility of the prior coating compositions of Taft has, in particular, rendered them unsuitable in applications where the coating will be subjected to stress, for example, in floor tile coatings. The poor flexibility of the coatings is thought to be due to the presence of inflexible aromatic rings joined by short hydrocarbon chains.

Finally, the large size of the dephenolic acid capping compound in Canadian Pat. No. 1,005,943 produces a steric blockng hindering access of the isocyanate groups to the unreacted hydroxyl groups.

SUMMARY OF THE INVENTION

It is an object of this invention to provide coating compositions which can be cured to urethane coatings of improved flexibility, good colour stability, improved chemical resistance, high gloss and which exhibit good adhesion to substrates.

It is a further object of this invention to provide such compositions that can be rapidly cured at ambient temperature by means of a vapour phase catalyst.

It is still a further object of this invention to provide a process of forming a coated substrate, in which the coating is a cured urethane having good adhesion to the substrate, of satisfactory flexibility, good colour stability, good chemical resistance and high gloss.

It is yet another object of the invention to provide such a process in which the coating is rapidly cured at ambient temperature with a vapour phase catalyst.

It is still another object of the invention to provide a coated substrate in which the coating is of satisfactory flexibility and gloss and has good colour stability, chemical resistance and good adhesion of the coating to the substrate.

It is still another object of the invention to provide a coated substrate in which the coating has a flexibility satisfactory for floor tile and other applications where high flexibility is demanded.

According to the invention there is provided a process for producing a coated surface comprising:
 (a) applying to a surface to be coated, a liquid film of a urethane forming composition comprising:
  (i) an alkyd resin modified with an aromatic hydroxy compound selected from the group consisting of p-hydroxybenzoic acid and 2,6-dimethylol-p-cresol to provide side chain aromatic hydroxyl groups on the alkyd resin backbone, and
  (ii) at least one organic isocyanate selected from the group consisting of di- and poly-isocyanates, said at least one isocyanate having an at least partial aromatic character, and
 (b) curing the composition to form a solid urethane coating.

In the curing, the hydroxyl groups in the alkyd resin, particularly the aromatic hydroxyl groups react with the isocyanate groups.

In a particular embodiment of the invention the reaction between the aromatic hydroxyl groups and the isocyanate groups is catalysed by an organic amine, particularly a tertiary amine, in a vapour phase, at ambient temperature.

In another aspect of the invention there is provided a curable coating composition comprising (i) an alkyd resin modified with p-hydroxy benzoic acid or 2,6-dimethylol p-cresol to provide side chain aromatic hydroxyl groups in the alkyd resin backbone in admixture with (ii) at least one organic isocyanate selected from the group consisting of di-isocyanates and poly-isocyanates, said isocyanate having at least partial aromatic character.

In a particular embodiment of this aspect of the invention the composition further includes an organic amine, particularly a tertiary amine, in a vapour phase, effective to catalyse the curing of the coating composition at ambient temperature.

In especially preferred embodiments of the invention the coating composition includes a pigment, for example, a metal oxide, such that a coloured decorative film is formed by the coating composition.

In yet another aspect of the invention there is provided a coated substrate comprising a substrate having a cured urethane coating thereon derived by reaction between (i) an alkyd resin modified with p-hydroxy benzoic acid or 2,6-dimethylol-p-cresol to provide side chain aromatic hydroxyl groups in the alkyd resin backbone and (ii) at least one organic isocyanate selected from the group consisting of diisocyanates and polyisocyanates.

DESCRIPTION OF PREFERRED EMBODIMENTS

(a) Alkyd Resin

An alkyd resin is an oil modified polyester resin and broadly is the product of the reaction of a di- or polyhydric alcohol and a di- or poly-basic acid or acid derivative in the presence of an oil, fat or carboxylic acid derived from such oil or fat which acts as a modifier. Such modifiers are typically drying oils.

The alkyd resin is formed in one embodiment employing p-hydroxy benzoic acid by reacting in a first stage the dihydric or polyhydric alcohol or a mixture of such alcohols with the p-hydroxy benzoic acid; and reacting the resulting product mixture in a second stage with a di- or poly-basic acid, or an anhydride thereof, or a mixture of such acids and/or anhydrides in the presence of the drying oil.

The reactants in the first and second stages are employed in amounts such that the resulting modified alkyd resin contains free hydroxyl groups from the di- or polyol reactant used in the first stage, in addition to the aromatic hydroxyl groups from the p-hydroxy benzoic acid.

This two stage reaction has the advantage that the p-hydroxy benzoic acid is efficently employed without loss by sublimation. However, the reaction can be carried out in a single stage in which case the reaction will generally proceed with initial formation of the alkyd resin backbone, the carboxyl group of the p-hydroxy benzoic acid then reacting with hydroxyl groups in the formed backbone.

The single stage reaction has the disadvantage that there may be some loss of p-hydroxy benzoic acid by sublimation, but, on the other hand, it is generally more convenient, particularly in a commercial operation, to employ a single stage reaction.

The 2,6-dimethylol-p-cresol is suitably introduced or grafted into the formed alkyd. In particular the dihydric or polyhydric alcohol or a mixture of such alcohols is reacted, in a first stage, with a di- or poly-basic acid, or an anhydride thereof, or a mixture of such acids and/or anhydrides in the presence of the drying oil to form the alkyd.

The 2,6-dimethylol-p-cresol is then reacted with the alkyd, suitably at a lower temperature that that employed in the alkyd formation; an aliphatic methylol hydroxy group in the 2,6-dimethylol-p-cresol reacts with a hydroxyl group in the alkyd to form an ether linkage whereby the 2,6-dimethylol-p-cresol forms a side chain on the alkyd; or the aliphatic methylol hydroxyl group may react with a carboxyl group in the alkyd to form an ester side chain.

(i) Alcohol component

The dihydric or polyhydric alcohol employed in the first stage is suitably an aliphatic alcohol; suitable alcohols include glycol, 1,2- or 1,3-propylene glycol, butane diol, hexane diol, neopentyl glycol glycerol, trimethylolethane, trimethylolpropane and pentaerythritol. Mixtures of the alcohols may also be employed, particularly to provide a desired content of hydroxyl groups. When pentaerythritol is employed alone as the alcohol component there is some tendency for cross-linking between hydroxyl groups and this produces a more brittle coating.

It is especially preferred to employ pentaerythritol in conjunction with an alcohol having a lower hydroxyl number, for example, glycerol or trimethylol propane. In this way a desired high content of hydroxyl groups can be obtained while avoiding the cross-linking experienced with pentaerythritol alone, so as to form a more flexible, as opposed to a brittle, coating.

In a preferred embodiment of one aspect of the invention an excess of a mixture of trimethylol propane and pentaerythritol is reacted with p-hydroxy benzoic acid in the first stage of the alkyd manufacture to produce a product mixture which comprises unreacted polyol and the esterification product of p-hydroxybenzoic acid with the polyols.

(ii) Acid Component

The dibasic or polybasic acid, or corresponding anhydrides employed in the second stage of the alkyd manufacture may be selected from a variety of aliphatic and aromatic carboxylic acids. Suitable acids and acid anhydrides include, by way of example, adipic acid, phthalic anhydride, isophthalic acid, dodecane dioic acid and bis 3,3',4,4'-benzophenone tetracarboxylic anhydride. Mixtures of these acids and anhydrides may be employed to produce a balance of properties.

In particular it is preferred to employ a mixture of phthalic anhydride and adipic acid. Phthalic anhydride tends to produce a tougher more brittle urethane coating, by including adipic acid in the reaction mixture a more flexible urethane coating can ultimately be obtained. The use of dedecane dioic acid imparts even greater flexibility.

Mono-basic carboxylic acids, for example, benzoic acid can similarly be included as chain terminators to decrease the chain length of the backbone according to viscosity requirements.

(iii) Aromatic hydroxy compound p-Hydroxy benzoic acid is readily available and the position of the carboxyl group para to the hydroxyl group avoids yellowing in the coating by preventing formation of the quinanoid type structure as described above. By comparison when 3,5-dihydroxy benzoic acid was employed it was found that yellowing occurred, which would not be acceptable in top coat applications.

2,6-Dimethylol-p-cresol is also readily available and the methyl group in the para position prevents yellowing by preventing formation of the quinanoid type structure. In addition the methylene group between the aliphatic hydroxyl groups and the benzene ring give added flexibility when the 2,6-dimethylol-p-cresol is introduced as a side chain on the alkyd.

The oil, fat or fatty acid, which is also referred to as drying oil and which is employed in the second stage of the two stage alkyd manufacture reacts as fatty acid with aliphatic hydroxyl groups in the product mixture of the first reaction stage and increases the flexibility of the ultimate urethane coating.

As the fatty acid there is suitably employed a saturated or unsaturated fatty acid of 12 to 22 carbon atoms or a corresponding triglyceride, that is a corresponding fat or oil, such as those contained in animal or vegetable fats or oils. Suitable fats and oils include tall oil, castor oil, coconut oil, lard, linseed oil, palm oil, peanut oil, rapeseed oil, soyabean oil and beef tallow.

Such fats and oils comprise mixed triglycerides of such fatty acids as caprylic, capric, lauric, myristic, palmitic and stearic and such unsaturated fatty acids as oleic, eracic, ricinoleic, linoleic and linolenic. Chemically these fats and oils are usually mixtures of two or more members of the class. The suitable fatty acids include those indicated with reference to the fats and oils. Hydroxy-substituted fatty acids, for example, 12-hydroxy stearic acid may also be employed. Especially preferred fatty acids are the fatty acid mixtures derived from soyabean oil, i.e., soya fatty acids, and from tall oil, i.e., tall oil fatty acids, which are composed predominantly of linoleic and oleic acids with lesser amounts of linoleic, palmitic and stearic acids.

Commercially available fatty acids usually comprise mixtures even when identified by a specific name such as stearic acid. It will be understood that in this specification a reference to a fatty acid is intended to embrace such mixtures.

Dimer and trimer acids may also be employed in the invention.

(v) Manufacture of the Modified Alkyd Resin

As indicated above the modified alkyd resin is prepared in a one or two stage process, and amounts of the reactants are employed so that the modified alkyd resin contains free hydroxyl groups from the di- or polyhydric component as well as aromatic hydroxyl groups.

In an especially preferred embodiment of the two stage process employing p-hydroxybenzoic acid, the modified alkyd resin is prepared by reacting together a mixture of trimethylolpropane and pentaerythritol with p-hydroxy benzoic acid in the first stage to produce a product mixture, as described previously comprising unreacted polyol and esters of the acid with the polyols. This product mixture is then reacted with the acid component and the drying oil component. In a preferred embodiment the acid component comprises a mixture of adipic acid and phthalic anhydride and the drying oil is soya fatty acid.

In an especially preferred embodiment of the one stage process employing p-hydroxybenzoic acid, the modified alkyd resin is prepared by mixing the same preferred reactants and reacting them together. In this case the di- or polybasic acid component and the polyol component which form the alkyd resin backbone probably react first to a predominant extent, with the drying oil reacting with the thus formed backbone to form side branches in the backbone and finally the p-hydroxy benzoic acid, which is less reactive, reacting in to also form side branches in the backbone.

In an especially preferred embodiment of the process employing 2,6-dimethylol-p-cresol, the alkyd is first prepared by reacting together the di- or polyhydric alcohol component, the di- or polybasic acid or acid anhydride component and the oil, fat or carboxylic acid modifier components and then reacting the 2,6-dimethylol-p-cresol into the alkyd.

The preparation of the alkyd into which 2,6-dimethylol-p-cresol is to be introduced is suitably carried out at a temperature in the range of 320° F. to 460° F., whereafter the 2,6-dimethylol-p-cresol is introduced by a reaction at the temperature of reflux of the solvent employed, preferably below 300° F.

The one stage and the two stage process employing p-hydroxybenzoic acid are suitably carried out at a temperature in the range of 340° F. to 460° F.

The flexibility of the ultimate urethane coating can be increased or decreased by increasing or decreasing the amount of adipic acid relative to phthalic anhydride; and the flexibility can be further increased by replacing at least part of the adipic acid by dodecane dioic acid, or other di- or polybasic acids having long aliphatic chains. Also a high solids resin can be prepared by replacing part of the phthalic anhydride with benzoic acid. Similarly high solids resins can be produced by replacing part of the pentaerythritol with a diol, for example, ethylene glycol, propylene glycol, butane diol or hexane diol or mixtures thereof.

The proportions of the components is preferably controlled such that the modified alkyd resin contains free hydroxyl groups originating from the dihydric or polyhydric alcohol, which are thus aliphatic hydroxyl groups, in addition to the aromatic hydroxyl groups. Both the aromatic and aliphatic hydroxyl groups will react with the isocyanate groups of the isocyanate component of the composition to form the urethane linkages, however, it is believed that the aromatic hydroxyl groups react first.

The alkyd resin can be visualized as being composed of a linear polyester backbone derived from the di- or poly-hydric alcohol and the di- or poly-basic acid, with modifications in the side chain and chain terminations being produced by the drying oil component, the p-hydroxy benzoic acid or 2,6-dimethylol-p-cresol and the optional monobasic acids to give the desired chain length and aromatic hydroxyl content.

Schematically a modified alkyd resin useful in the invention might be represented:

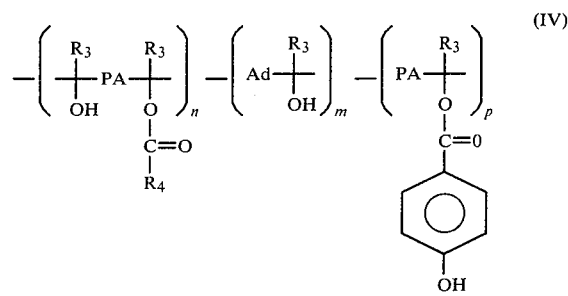

(IV)

in which:

PA is the phthalic anhydride nucleus resulting from reaction of phthalic anhydride with hydroxyl groups of a dihydric or polyhydric alcohol, i.e.

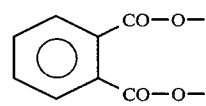

Ad is the adipic acid nucleus resulting from reaction of adipic acid with the hydroxyl groups of the dihydric or polyhydric alcohol, i.e., —O—CO—(CH$_2$)$_4$—CO—O—.

$R_3$ is the nucleus of a dihydric or polyhydric alcohol having hydroxyl groups which have reacted with phthalic anhydride or adipic acid, $R_4$ is the aliphatic hydrocarbon radical of a fatty acid of a drying oil, and n, m and p are integers of 1 or more.

In more general terms the alkyd resin might be schematically represented:

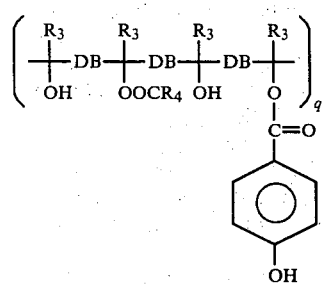
(V)

in which $R_3$ and $R_4$ are as defined above, DB is the nucleus of a di- or polybasic acid or an anhydride thereof resulting from reaction with the hydroxyl groups of the dihydric or polyhydric alcohol, and q is an integer greater than 1.

The integer q will typically be from 1.5 to 5, and preferably 3.2 to 4.4.

It will be recognized that the sequence of units in schematic representations (IV) and (V) and the frequency of occurrence of free hydroxyl groups, $R_4$ and

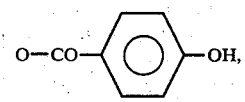

will not necessarily be regular, further a particular resin may include several different radicals $R_3$ and $R_4$ and in the case of (V) different Nuclei DB.

The schematic representations (IV) and (V) illustrate modified alkyd resins in which the aromatic hydroxyl is provided by the grouping

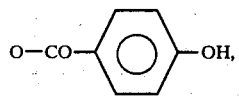

derived from p-hydroxybenzoic acid. When the aromatic hydroxyl is provided by 2,6-dimethylol-p-cresol, the

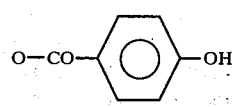

grouping in representations (IV) and (V) is replaced by the grouping—$CH_3$

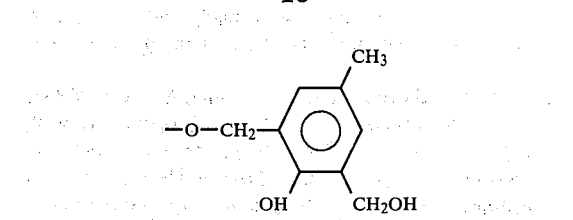

(b) Isocyanate

The modified alkyd resin comprises a first component of the coating composition and the second component is an isocyanate.

The isocyanate component is an organic di- or polyisocyanate and may comprise a mixture of such isocyanates.

Aromatics or aliphatic isocyanates can be employed but when rapid cure with a tertiary amine is required, the isocyanate should have an aromatic character. The unsuitability of the aliphatic isocyanate arises from the lack of a stabilized intermediate as illustrated in scheme (III) below:

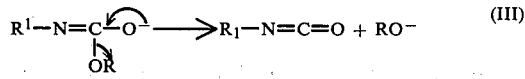
(III)

When $R^1$ is an aromatic ring or has aromatic character it probably imparts stabilization of the negative charge on the nitrogen atom and thus facilitates fast curing.

Consequently the isocyanate should be fully aromatic or of a mixed aromatic-aliphatic character, so that it has an at least partial aromatic character.

Aromatic isocyanates like the phenolics can produce yellowing in the urethane coating, if the para position of the isocyanate is not blocked.

This probably occurs by the gradual conversion of the isocyanate to the amino group which then forms a quinoid type structure, in the presence of ultra violet light in accordance with equation (VII):

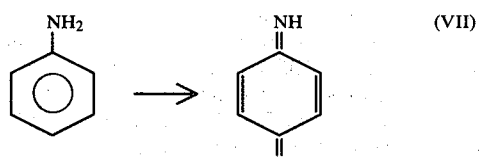
(VII)

However, the problem is not as severe as in the case of the phenolic component and can be reduced by reacting all of the isocyanate. This is readily achieved in the present invention employing the vapour phase catalyst, in which the hydroxyl and isocyanate groups react rapidly. in the vapour phase catalyst is not employed, problems occur after partial reaction of hydroxyl and isocyanate groups. In particular steric hindrance and lack of fluidity of the reaction system with partial cure prevent the reaction from continuing to completion, thereby leaving free isocyanate groups which eventually cause yellowing.

A second problem with aromatic isocyanates is that the aromatic rings may produce an inflexible, urethane coating.

Consequently it is especially preferred to employ isocyanates with both an aromatic and an aliphatic character.

In particular there may be mentioned Mondur CB-60 (trade mark for an adduct of toluene diisocyanate with trimethylolpropane, available from Mobay Chemical Corporation, Pittsburgh), and Mondur HC (trade mark for a polymer of toluene diisocyanate and hexamethylene diisocyanate, available from Mobay Chemical Corporation Pittsburgh).

The adduct of Mondur CB-60 has the structure—

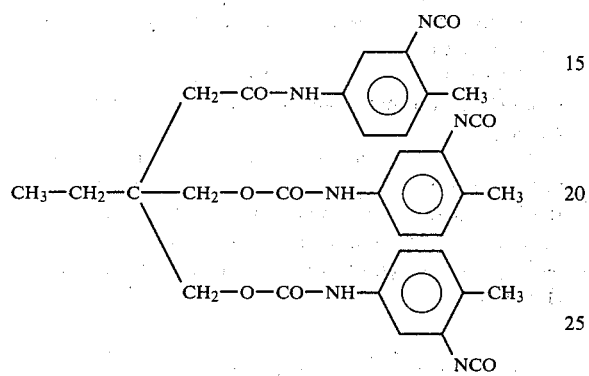

and the polymer of Mondur HC can be represented by the structure:

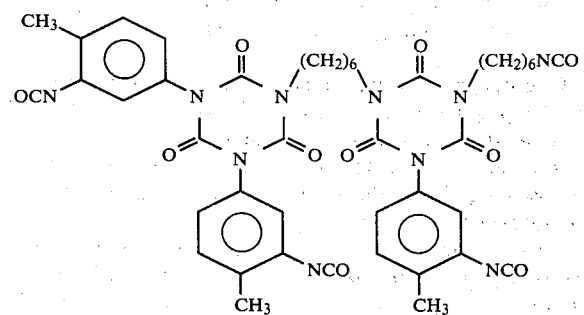

The aliphatic character of these isocyanates promotes flexibility in the urethane coatings, offsetting the effect of the aromatic rings; particularly the hexamethylene chain in Mondur HC give more freedom of movement.

Other isocyanates that can be employed in the invention include 2,4- and 2,6-toluene diisocyanate, 1,5-naphthalene diisocyanate, triphenylmethane, triisocyanate, xylylene diisocyanate, xylene diisocyanate, polymethylene polyphenyl isocyanates, diphenylmethane diisocyanate and chlorophenylene-2,4-diisocyanate.

Generally speaking isocyanates with an aromatic character react with active hydrogen, for example, in hydroxyl groups, more rapidly than do aliphatic isocyanates. For example, the gellation time at 70° C. of three different isocyanates catalyzed by triethylene diamine has been recorded as follows:

| Isocyanate | Gellation time (min) at 70° C. |
|---|---|
| Tolylene diisocyanate | 4 |
| meta-Xylene diisocyanate | 80 |
| Hexamethylene diisocyanate | >240 |

(c) Urethane Manufacture

The modified alkyd resin component and the isocyanate component are suitably mixed just prior to use, such that the isocyanate concentration is sufficient to react with the hydroxyl groups in the modified alkyd resin. Generally, the mixture has a potlife of 24 to 84 hours.

An OH:NCO ratio of 1:1 is sufficient; however, if excess hydroxyl groups are present they will remain uncured and render the coating tacky whereas excess isocyanate groups, if present, will be cured by moisture.

In addition the presence of uncured phenolic hydroxyl groups results in urethane coatings of poor caustic resistance due to ionization to the phenoxide ion.

Therefore, an OH:NCO ratio of 1:1 to 1.5, and preferably 1:1.1 to 1.2 is generally employed.

The modified alkyd resin and the isocyanate components are suitably blended in a solvent. Each component may initially be present in a suitable solvent, inert to the components.

An especially preferred solvent system comprises a mixture of xylene and ethylene glycol monoethyl ether acetate ("Cellosolve" acetate, a trade mark of Union Carbide Corp.).

Other suitable solvents include ketones, for example, methyl isobutyl ketone, cyclohexanone and methyl ethyl ketone; esters, for example, butyl acetate, ethylacetate and amylacetate; and aromatic solvents, for example, toluene, xylene which suitably can be blended with ketone or ester solvents such as those indicated.

When the two components are mixed in an appropriate ratio and applied, for example, as a coating film, the film can be cured to a tack-free state in up to 60 seconds, by exposure of the coated material to a tertiary amine vapour.

Suitable tertiary amines include trimethylamine, triethyl amine, ethyldimethyl amine and methyldiethyl amine, with triethylamine being especially prefered. Triethylamine is readily volatilized at room temperature by bubbling an inert gas, such as nitrogen, through it at room temperature.

In the commercial operation of the invention a coated substrate is cured in a sealed chamber into which the tertiary amine vapour is introduced. The coating composition comprising the two components is suitably applied to the substrate in a wet thickness of 1 to 2.5, preferably 1.25 to 1.75 and more preferably about 1.5 mils and can be cured in the sealed chamber in 5 to 25, and typically about 15 seconds.

The curing with the vapour phase catalyst may, in particular, be carried out as described in U.S. Pat. Nos. 3,851,402 and 3,931,684, the disclosures of which are herein incorporated by reference.

It will be recognized that the coating thickness will be somewhat dependent on the application. When floor tiles are being produced a greater thickness of coating may be desirable, and, in particular a wet thickness of 3 to 6, preferably about 4 mil may be employed.

The compositions of the invention provide high gloss, good substrate adhesion, flexibility and colour retention, overcoming deficiencies in prior art compositions. The compositions can be applied to a variety of substrates, including wood, paper, textiles, metals, glass, hardboard sheet and other wood-based sheets, plaster board, sheets of gypsum and polymer sheets, for example, polyvinyl chloride. It will be evident that the substrate may be selected from a variety of materials which are self-supporting and in sheet form.

The coatings may be employed in a variety of applications including floor tiles, enamels, rapid cure printing inks, textiles and aircraft and automobile finishes.

The composition of the invention may include additives particularly in the modified alkyd resin component, for example, pigments.

When a pigment is to be included to provide a coloured film, it is appropriate to employ the pigment in a pigment to organic resin forming solids ratio of about 0.75 to 2.5:1 and preferably about 1:1. By organic resin forming solids is intended the organic reagents in the reaction charge which ultimately form part of the urethane.

As the pigment there may be employed organic dyes as well as inorganic pigments such as metal oxides, for example titanium dioxide.

EXAMPLES

The following example shows the preparation of an alkyd modified with p-hydroxybenzoic acid in a two stage process:

EXAMPLE I

| TYPICAL CHARGE | | MW | GRAMS. |
|---|---|---|---|
| Stage I | p-Hydroxy benzoic acid (PHBA) | 138 | 91.0 |
| | Pentaerythritol technical (PE. Tech) | 140.8 | 70.4 |
| | Trimethylol propane (TMP) | 133.8 | 70.0 |
| | | Total | 231.4 |
| | | —H$_2$O | 12.0 |
| | | Total | 219.4 |
| Stage II | Soya fatty acids (soya FA*) | 280 | 168.0 |
| | Phthalic anhydride (PA) | 148 | 29.0 |
| | Adipic acid | 146 | 85.0 |
| | | Total | 501.4 |
| | | —H$_2$O | 35.3 |
| | | Total | 466.1 |

*The example cited is for soya fatty acids. Other acids like coconut oil fatty acids, 12-hydroxy stearic acid, tall oil fatty acid, castor oil fatty acids etc. were used instead of soya fatty acids in a similiar fashion.

This preparation is a two stage reaction. In the first stage the PHBA, TMP and PE are charged in a four-necked two liter flask equipped with a stirrer, thermometer, nitrogen inlet water trap and condenser. The mixture is reacted at a temperature of 340°–360° F. to esterify the PHBA while maintaining the mixture in an atmosphere of nitrogen and under agitation. The esterification reaction is stopped when the theoretical amount of water corresponding to the esterification of PHBA is collected. The content is cooled to about 300° F. and the charge comprising soya fatty acids, phthalic anhydride and adipic acid is added to the flask. The resulting mixture is heated to a temperature of 360°–450° F. under nitrogen, with stripping off of the water of reaction periodically. The reaction is stopped when the acid value reaches below 15 (mixed indicated method). It is appropriate to employ a 3 to 5%, by weight, solvent reflux for the reaction.

At the end of the reaction the product is cooled to a temperature of about 300° F. and cut to 60% solids by using a mixture of xylene and Cellosolve acetate, whereafter the mixture is cooled to room temperature.

A first portion of the resulting resin was blended with Mondur HC so that the OH:NCO ratio was about 1:1.1. A clear film of 1.5 ml thickness was then drawn down on a hardboard panel and cured by exposing to triethylamine vapour.

A second portion of the resin was blended with a pigment and the pigmented resin was then blended with Mondur HC and the procedure indicated above was followed whereby there was produced a coloured coating.

The following example shows the preparation of an alkyd modified with p-hydroxybenzoic acid in a one stage process:

EXAMPLE II

| TYPICAL CHARGE | MW | GRAMS. |
|---|---|---|
| Soya fatty acid | 280 | 231 |
| Phthalic anhydride | 148 | 51.8 |
| Adipic acid | 146 | 87.6 |
| p-Hydroxy benzoic acid | 138 | 89.7 |
| Pentaerythritol technical | 140.8 | 102 |
| Trimethylol propane | 133.8 | 58.2 |

All the materials were charged together and cooked to an acid value of 13 (mixed indicator method), at a temperature in the range of 340° to 440° F.

At the end of the reaction the product was cooled to a temperature of about 300° F. and cut to 60% solids with a solvent mixture of xylene and Cellosolve acetate, whereafter the mixture was cooled to room temperature.

EXAMPLE III

The following formulation was employed—

| Alkyd resin of Example I | 60% N.V. | 100 grams |
|---|---|---|
| Mondur HC | 60% N.V. | 70 grams |

The two components were blended by hand and diluted with Cellosolve acetate to a viscosity of about 45 to 60 seconds on a No. 4 Ford cup.

A film of 1.5 ml thickness was drawn down on a glass sheet and cured by exposing to triethyl amine vapour. The film obtained a tack free stage in about 15 seconds and after 15 minutes was difficult to peel from the glass sheet.

A second film of 1.5 mil thickness was drawn down on a base coated panel and cured by exposing to triethylamine vapour, the results of gloss, adhesion and flexibility tests on the film are set out in Table II below.

EXAMPLE IV

A white coating composition was prepared employing the alkyd resin of Example I and Mondur HC:

| Formulation | Parts by weight |
|---|---|
| Alkyd resin of Example I | 24.7 |
| Titanium dioxide (Tioxide RHD3) | 58.0 |
| Mondur HC | 17.3 |
| | 100.0 |

The titanium dioxide was ground in alkyd resin, into a paste using Cellosolve acetate as the solvent, on a three-roll mill, to a fineness of 7 on the Hegman guage.

It was then thinned down to a viscosity of 45–60 seconds on a number 4 Ford cup using Cellosolve acetate.

The Mondur HC was then added and the mixture was blended thoroughly. A film of 1.5 ml thickness was drawn down on a masonite board and cured by exposing to the triethylamine vapour.

Table I below gives the cure time and the film properties of the formulations of Examples III and IV. The data is for a film of 1.5 ml thickness drawn down on a wood panel and cured in a curing unit, wherein triethylamine vapour was introduced into the curing chamber with nitrogen as the carrier gas.

The term curing time is employed to indicate that the film seemed to be cured through to the substrate, by testing with the finger tips for distortion of cured film overlying uncured film.

TABLE I

| Example | Cure Time (Seconds) | Adhesion* | Flexibility** | Gloss | Remarks |
|---|---|---|---|---|---|
| III | 30 20 10 | Excellent | Excellent | Very Good | High | Excellent resistance to xylene and caustic soda |
| IV*** | 30 20 10 | Excellent | Excellent | Fair | Medium | |

*Adhesion was tested by trying to remove the cured film with the edge of a coin.
**Flexibility was tested by applying the film on a steel panel bending it and looking for signs of cracks in the cured film.
***When a clear film is applied on top of the film from Example II excellent gloss and mar resistance were obtained.

EXAMPLE V

The following formulation was employed:

| | |
|---|---|
| Alkyd resin of Example II | 100 grams |
| Mondur HC | 65 grams |

The two components were blended by hand and diluted with Cellosolve acetate to a viscosity of 45 to 60 seconds.

A first film of 1.5 ml thickness was drawn on a base coated hardboard panel and cured by exposing to triethylamine vapour, the results of gloss, adhesion and flexibility tests on the film are set out in Table II below.

A second film of 1.5 ml thickness was drawn on an untreated cold rolled steel sheet and cured by exposing to triethylamine vapour, the results of adhesion and flexibility tests are set out in Table III below.

TABLE II

| | CLEAR COATINGS ON BASE COATED PANELS | | | | |
|---|---|---|---|---|---|
| Film | Viscosity No. 4 Ford Cup | Gloss (60°) After 120 hr. | 1 hour adhesion | 24 hour adhesion | Flexibility (Conical Mandrel) |
| Example III | 49 sec. | 93.5 | 5 | 5 | 5 |
| Example V | 53 sec. | 94 | 5 | 5 | 5 |

TABLE III

| CLEAR COATINGS ON COLD ROLLED STEEL | | | |
|---|---|---|---|
| Coating | 1 hr. Adhesion | 24 hr. Adhesion | Flexibility |
| Example V | 4 | 4 | 5 |

In Tables II and III the adhesion and flexibility were rated on a scale of 0 to 5, 5 being excellent.

In the gloss test in Table II, the coated panels after curing with triethylamine were left at ambient conditions for 120 hours, whereafter the gloss was determined. As can be seen in Table II the films displayed high gloss rendering them suitable for top coat applications.

The following example shows the preparation of an alkyd modified with 2,6-dimethylol-p-cresol:

EXAMPLE VI

| First Stage Charge | | |
|---|---|---|
| | Wt. (g) | M.W. |
| Coconut fatty acid | 90 | 205 |
| Adipic acid | 90 | 146 |
| Phthalic anhydride | 22 | 148 |
| Hexamethylene diol | 59 | 118 |
| Trimethylol propane | 67 | 134 |
| Total | 328 | |
| —H$_2$O | 32.7 | |
| | 295.3 | |

The charge ingredients were charged into a four-neck, 1 liter flask equipped with a heating mantle, water separator, condenser, agitator and nitrogen inlet. Toluene in an amount of 3%, by weight was added to the charge as a reflux solvent. The charge was heated under reflux and agitation, under an atmosphere of nitrogen. The heating was stopped when the acid value reached about 10 to 12. The temperature during reflux varied between about 320° and 450° F.

In a second stage the reaction charge was as follows:

| Second Stage Charge | | |
|---|---|---|
| | Wt. (g) | M.W. |
| Reacted Material from First Stage | 295.3 | |
| 2,6-dimethylol-p-cresol | 70 | 168 |
| Total | 365.3 | |
| —H$_2$O | 7.5 | |
| | 357.8 | |

The reacted material from the first stage was cut to 80% solids with toluene as the solvent and the 2,6-dimethylol-p-cresol was then charged and the charge heated to toluene reflux below 300° F. under an atmosphere of nitrogen; the water produced was collected and when the calculated amount was collected the reaction product was cut to 65% solid using Cellosolve acetate (ethylene glycol monoethyl ether acetate).

EXAMPLE VII

The modified alkyd from Example VI was blended with isocyanate as follows:

|  |  | Parts by weight |
|---|---|---|
| Modified alkyd | 65% solids | 100 |
| Mondur HC | 60% solids | 65 |
| Cellosolve acetate |  | 43 |

The mixture was blended to a viscosity of 45 seconds on a No. 4 Ford cup. A film of 4 mil wet thickness was applied on a polyvinyl chloride sheet floor tile and was cured in 45 seconds in a triethylamine vapour to a tack-free state. The resulting coating had excellent gloss, good flexibility and showed good adhesion to the sheet.

EXAMPLE VIII

Example VI was repeated using dodecane dioic acid instead of adipic acid and Example VII was repeated using the resulting modified alkyd, the coating obtained had a flexibility superior to that in Example VII.

We claim:

1. A process for producing a coated surface comprising:
   (a) applying to a surface to be coated, a liquid film of a urethane forming composition comprising:
      (i) an alkyd resin modified with 2,6-dimethylol-p-cresol to provide side chain aromatic hydroxyl groups on the alkyd resin backbone, and
      (ii) at least one organic isocyanate selected from the group consisting of di- and poly-isocyanates, said at least one isocyanate having an at least partial aromatic character, wherein
      (iii) components (i) and (ii) are present in amounts such that the radio of active hydroxyl hydrogen groups in (i) to isocyanate groups in (ii) is 1:1 to 1.5, and
   (b) curing the composition to form a solid urethane coating.

2. A process according to claim 1, wherein said curing comprises exposing said liquid film to a tertiary amine vapour.

3. A process according to claim 2, wherein said amine is triethylamine.

4. A process according to claim 1, wherein the modified alkyd resin is prepared in a two stage process, in which the first stage comprises reacting together at a temperature of 320° to 460° F. a mixture comprising an excess of at least one di- or polyhydric aliphatic alcohol, at least one acid component selected from the group consisting of di- and polybasic acids and anhydrides of said acids and a drying oil to form an alkyd, and in a second stage reacting the alkyd with 2,6-dimethylol-p-cresol.

5. A process according to claim 4, wherein said alcohol comprises a mixture of trimethylolpropane and pentaerythritol, and said acid component comprises adipic acid and phthalic anhydride.

6. A process according to claim 5, wherein said drying oil comprises soya fatty acids.

7. A process according to claim 5, wherein said composition is applied to a wood-based sheet substrate in a wet thickness of 1.25 to 1.75 mils and said liquid film is exposed to said vapour for 5 to 25 seconds to effect said curing.

8. A process according to claim 7, wherein said isocyanate is a polymer of toluene diisocyanate and hexamethylene diisocyanate.

9. A process according to claim 7, wherein said isocyanate is an adduct of toluene diisocyanate and trimethylolpropane.

10. A process according to claim 1, wherein components (i) and (ii) are present in amounts such that the ratio of active hydroxyl hydrogen groups in (i) to isocyanate groups in (ii) is 1:1.1 to 1.2.

11. A curable coating composition comprising:
   (i) an alkyd resin modified with 2,6-dimethylol-p-cresol, to provide side chain aromatic hydroxyl groups in the alkyd resin backbone, in admixture with
   (ii) at least one organic isocyanate selected from the group consisting of diisocyanates and polyisocyanates, said isocyanate having an at least partial aromatic character, wherein
   (iii) components (i) and (ii) are present in amounts such that the ratio of active hydroxyl hydrogen groups in (i) to isocyanate groups in (ii) is 1:1 to 1.5.

12. A composition according to claim 11, further including an organic tertiary amine.

13. A composition according to claim 11, wherein the modified alkyd resin is prepared in a two stage process, in which the first stage comprises reacting together at a temperature of 320° to 460° F. a mixture comprising an excess of at least one di- or polyhydric aliphatic alcohol, at least one acid component selected from the group consisting of di- and polybasic acids and anhydrides of said acids and a drying oil to form an alkyl, and in a second stage reacting the alkyd with 2,6-dimethylol-p-cresol.

14. A composition according to claim 13, wherein said alcohol comprises a mixture of trimethylolpropane and pentaerythritol, and said acid component comprises adipic acid and phthalic anhydride.

15. A composition according to claim 14, wherein said isocyanate is a polymer of toluene diisocyanate and hexamethylene diisocyanate.

16. A composition according to claim 14, wherein said isocyanate is an adduct of toluene diisocyanate and trimethylolpropane.

17. A composition according to claim 14, wherein components (i) and (ii) are present in amounts such that the ratio of active hydroxyl hydrogen groups in (i) to isocyanate groups in (ii) is 1:1.1 to 1.2.

18. An article comprising a substrate coated with a cured urethane coating derived from a urethane forming composition comprising:
   (i) an alkyd resin modified with 2,6-dimethylol-p-cresol to provide side chain aromatic hydroxyl groups on the alkyd resin backbone, and
   (ii) at least one organic isocyanate selected from the group consisting of di- and polyisocyanates, said at least one isocyanate having an at least partial aromatic character, wherein
   (iii) components (i) and (ii) are present in amounts such that the ratio of active hydroxyl hydrogen groups in (i) to isocyanate groups in (ii) is 1:1 to 1.5.

19. An article according to claim 18, wherein said substrate comprises a wood-based sheet.

20. An article according to claim 18, wherein the modified alkyd resin is prepared in a two stage process, in which the first stage comprises reacting together at a temperature of 320° to 460° F. a mixture comprising an excess of at least one di- or polyhydric aliphatic alcohol, at least one acid component selected from the group consisting of di- and polybasic acids and anhydrides of said acids and a drying oil to form an alkyd, and in a second stage reacting the alkyd with 2,6-dimethylol-p-cresol.

21. An article according to claim 20, wherein said alcohol comprises a mixture of trimethylolpropane and pentaerythritol, and said acid component comprises adipic acid and phthalic anhydride.

22. An article according to claim 21, wherein said isocyanate is a polymer of toluene diisocyanate and hexamethylene diisocyanate.

23. An article according to claim 21, wherein said isocyanate is an adduct of toluene diisocyanate and trimethylolpropane.

24. An article according to claim 18, wherein components (i) and (ii) are present in amounts such that the ratio of active hydroxyl hydrogen groups in (i) to isocyanate groups in (ii) is 1:1.1 to 1.2.

* * * * *